United States Patent [19]

Onishi et al.

[11] Patent Number: 5,239,003
[45] Date of Patent: Aug. 24, 1993

[54] PROCESS FOR PREPARATION OF STYRENE RESIN COMPOSITION AND STYRENE RESIN COMPOSITION

[75] Inventors: Hidenori Onishi, Yokohoma; Hiroyuki Watanabe, Kanagawa, both of Japan

[73] Assignee: Nippon Zeon Co., Ltd., Tokyo, Japan

[21] Appl. No.: 798,748

[22] Filed: Nov. 27, 1991

[30] Foreign Application Priority Data

Nov. 30, 1990 [JP] Japan .................... 2-341121

[51] Int. Cl.$^5$ .................. C08L 9/06; C08L 25/06; C08L 25/08
[52] U.S. Cl. ................. 525/181; 525/153; 525/164; 525/184; 525/193; 525/333.6; 525/426
[58] Field of Search .......... 525/153, 157, 198, 333.6, 525/164, 181, 184, 193, 426

[56] References Cited

U.S. PATENT DOCUMENTS

| | | | |
|---|---|---|---|
| 4,222,882 | 9/1980 | Brulet et al. | 252/51.5 A |
| 4,647,625 | 3/1987 | Aonuma et al. | 528/232 |
| 4,735,994 | 4/1988 | Roggero et al. | 525/279 |
| 4,753,991 | 6/1988 | Bronstert | 525/98 |
| 4,791,174 | 12/1988 | Bronstert et al. | 525/274 |
| 4,816,520 | 3/1989 | Bronstert | 525/285 |
| 5,115,035 | 5/1992 | Shiraki et al. | 525/314 |

FOREIGN PATENT DOCUMENTS 1770353 10/1971 Fed. Rep. of Germany .
2075489 8/1971 France .
2416938 7/1979 France .

*Primary Examiner*—James J. Seidleck
*Assistant Examiner*—Patrick R. Delaney
*Attorney, Agent, or Firm*—Sherman and Shalloway

[57] ABSTRACT

A process for preparing a styrene resin composition which comprises subjecting to bulk or bulk-suspension polymerization a solution obtained by dissolving (A) a modified styrene polymer obtained by introducing directly or through another atomic group at least one functional group represented by the general formula

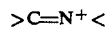

into the polymer chain of a styrene polymer obtained by polymerizing 90 to 100% by weight of a styrene monomer with 0 to 10% by weight if a monomer copolymerizable with the styrene monomer, if desired together with (B) a rubber-like polymer in (C) a styrene monomer.

16 Claims, No Drawings

PROCESS FOR PREPARATION OF STYRENE RESIN COMPOSITION AND STYRENE RESIN COMPOSITION

This invention relates to a method for preparing a styrene resin composition which is excellent in the dispersibility of additives such as pigments, flame retardants and inorganic fillers and wherein the lowering of physical properties due to the compounding of these additives is improved.

Prior Art

Since styrene resins are excellent in moldability and physical properties and moreover inexpensive, they are used in various uses, and particularly, rubber-modified styrene resins, which have impact resistance bestowed by compounding of rubber-like polymers such as polybutadiene, are widely utilized in the household appliance field, etc.

Incidentally, although various additives such as pigments, flame retardants and inorganic fillers are, if desired, compounded into styrene resins, styrene resins are, generally, poor in the dispersibility of additives, and thus due to compounding of these additives, physical properties such as mechanical strength and impact resistance are lowered. Particularly in rubber-modified styrene resins, the dispersibility of additives are very bad, and even when additives having a relatively small influence on the physical properties are selected, a tendency appears that the physical properties lower.

Heretofore, in order to improve the dispersibility of additives, investigations have been made, for example on a mixing method wherein a styrene resin and additives are preliminarily mixed in a powdery state using a supermixer or the like and the mixture is melt-kneaded, or on the selection of the kind or combination of additives, but there has yet been proposed no satisfying method to prevent the lowering of physical properties.

The object of this invention lies in providing a process for preparing a styrene resin composition which are excellent in the dispersibility of additives such as pigments, flame retardants and inorganic fillers and wherein the lowering of physical properties due to compounding of these additives is inhibited, and styrene resin compositions obtained by this process.

The present inventors intensely studied in order to overcome the problems which the prior arts have, and as a result found that various additives exhibit excellent dispersibility in a styrene resin composition obtained by bulk or bulk-suspension polymerizing a styrene monomer in the presence of a modified styrene polymer having a specific functional group, and that lowering of the physical properties by compounding of additives is very small, and completed this invention based on the findings.

Thus, according to this invention, there are provided a process for preparing a styrene resin composition which comprises subjecting to bulk or bulk-suspension polymerization a solution obtained by dissolving (A) a modified styrene polymer obtained by introducing directly or through another atomic group at least one functional group represented by the general formula

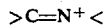

into the polymer chain of a styrene polymer obtained by polymerizing 90 to 100% by weight of a styrene monomer with 0 to 10 weight % of a monomer copolymerizable with the styrene monomer, if desired together (B) a rubber-like polymer in (C) a styrene monomer, and a styrene resin composition obtained by this process.

This invention is detailedly described below. (Modified styrene polymer (A))

A modified styrene polymer (A) wherein a specific functional group is bound, to be used in the invention, can, for example, be obtained by the following process.

Namely such modified styrene polymer (A) can be obtained by reacting a later-described organic compound with (1) a living anionic (co) polymer having the later-described metal at the terminal obtained by (co) polymerizing a styrene monomer alone or a styrene monomer and a monomer copolymerizable with the styrene monomer using a catalyst based on a metal such as an alkali metal and/or an alkaline earth metal (so-called anionic polymerizing catalyst), or (2) a copolymer obtained by binding the above metal, by post-reaction, to an unsaturated copolymer which comprises a styrene monomer and a monomer copolymerizable with the styrene monomer and has carbon-carbon double bonds in the polymer chain or in the side chain, and then hydrolyzing the resulting reaction product (the hydrolysis is carried out, for example, by addition of methanol or the like for discontinuation of the reaction, addition of water or an alcohol for isolation of the produced polymer from the reaction solution or steam stripping) (U.S. Pat. Nos. 4,550,142 and 4,647,625).

A styrene polymer can be obtained by polymerizing alone at least one styrene monomer selected from styrene, vinyltoluene, 1,3-dimethylstyrene, α-methylstyrene, chlorostyrene, vinylnaphthalene, etc. or by copolymerizing such at least one styrene monomer with another monomer copolymerizable with the styrene monomer. Therefore, styrene polymers in the invention include polymers of a styrene monomer and copolymers of a styrene monomer with another monomer.

Although the monomer copolymerizable with the styrene monomer is not particularly limited, conjugated diene monomers are particularly preferred such as butadiene, isoprene, piperylene and phenylbutadiene.

In order to enhance the dispersibility of additives, it is necessary that the modified styrene polymer is uniformly dispersed in the styrene resin composition as the objective product of the invention and as a result, the above functional group is uniformly dispersed. For this purpose, the rate of the styrene monomer in the total monomers forming the styrene polymer is necessarily 90% by weight or more and preferably 95% by weight or more. When the styrene polymer is a copolymer, the chain distribution of each monomer is not particularly limited, but preferably as random as possible. Further, the molecular weight of the styrene polymer is not particularly limited, but usually on the order of 1,000 to 500,000 as weight average molecular weight (calculated in terms of standard polystyrene measured by GPC).

As the alkali metal catalyst, there can, for example, be mentioned, as a representative one, an organic lithium compound having 2 to 20 carbon atoms such as n-butyllithium or sec-butyllithium. As the alkaline earth metal-based catalysts, there can be mentioned catalytic systems containing as the main component a compound of barium, strontium, calcium or the like, disclosed in U.S. Pat. Nos. 3,946,385, 3,992,561, 4,079,176, 4,092,268, 4,112,210, 4,129,705, 4,260,519 and 4,297,240 and the like, but they are not limited thereto.

The polymerization reaction and the addition reaction of an alkali metal and/or an alkaline earth metal are carried out in a hydrocarbon solvent conventionally used in anionic polymerization or a solvent not destroying the metal-based catalyst such as tetrahydrofuran, tetrahydropyran or dioxane.

The amount of such a catalyst to be used in the polymerization is usually in the range of 0.1 to 200 m moles per 100 g of the monomer.

Preferred examples of organic compounds to be used for introducing the above functional group into the styrene polymer include, for example, N-substituted lactams and thiolactams corresponding thereto such as N-methyl-$\beta$-propiolactam, N-t-butyl-$\beta$-propiolactam, N-methoxyphenyl-$\beta$-propiolactam, N-phenyl-$\beta$-propiolactam, N-naphthyl-$\beta$-propiolactam, N-methyl-2-pyrrolidone, N-t-butyl-2-pyrrolidone, N-phenyl-2-pyrrolidone, N-methoxyphenyl-2-pyrrolidone, N-vinyl-2-pyrrolidone, N-benzyl-2-pyrrolidone, N-naphthyl-2-pyrrolidone, N-methyl-5-methyl-2-pyrrolidone, N-t-butyl-5-methyl-2-pyrrolidone, N-phenyl-5-methyl-2-pyrrolidone, N-methyl-3,3-dimethyl-2-pyrrolidone, N-t-butyl-3-,3-dimethyl-2-pyrrolidone, N-phenyl-3-,3-dimethyl-2-pyrrolidone, N-methyl-2-piperidone, N-t-butyl-2-piperidone, N-phenyl-2-piperidone, N-methoxyphenyl-2-piperidone, N-vinyl-2-piperidone, N-benzyl-2-piperidone, N-naphthyl-2-piperidone, N-methyl-3-,3-dimethyl-2-piperidone, N-t-butyl-3,3-dimethyl-2-piperidone, N-methyl- -caprolactam, N-phenyl-$\epsilon$-caprolactam, N-methoxyphenyl-$\epsilon$-caprolactam, N-vinyl-$\epsilon$-caprolactam, N-benzyl-$\epsilon$-caprolactam, N-naphthyl-$\omega$-caprolactam, N-methyl-$\omega$-laurylolactam, N-phenyl-$\omega$-laurylolactam, N-t-butyl-$\omega$-laurylolactam, N-vinyl-$\omega$-laurylolactam and N-benzyl-$\omega$-laurylolactam; N-substitued ethyleneureas and corresponding N-substituted thioethyleneureas such as 1,3-dimethylethyleneurea, 1,3-diphenylethyleneurea, 1,3-di-t-butylethyleneurea and 1,3-divinylethyleneurea; N-substituted aminoketones and corresponding N-substituted aminothioketones such as 4-dimethylaminobenzophenone, 4-diethylaminobenzophenone, 4-di-t-butylaminobenzophenone, 4-diphenylaminobenzophenone, 4,4 '-bis(dimethylamino)benzophenone, 4,4'-bis-(diethylamino)benzophenone, 4,4'-bis(di-t-butylamino)benzophenone, 4,4'-bis(diphenylamino) benzophenone, 4,4'-bis(-divinylamino)benzophenone, 4-dimethylaminoacetophenone, 1,3-bis(diphenylamino)-2-propanone and 1,7-bis(methylethylamino)-4-heptanone; N-substituted aminoaldehydes and corresponding N-substituted aminothioaldehydes such as 3-dimethylaminopropionaldehyie, 3-diethylaminopropionaldehyde, 4-dimethylaminobenzaldehyde, 3-dicyclohexylaminopropionaldehyde, 3,5-bis(dicyclohexylamino)-benzaldehyde, 4-diphenylaminobenzaldehyde and 4-divinylaminobenzaldehyde; etc.

The use amount of such an organic compound is desirably in the range of 0.05 to 10 moles per 1 mole of the alkali metal and/or alkaline earth metal-based catalyst to be used when the metal is bound to the styrene polymer by the anionic polymerization and the postreaction. In an amount below 0.05 mole the improvement of stability in dispersion is insufficient, and in an amount above 10 moles it becomes difficult, due to side reaction, to dissolve the modified styrene polymer (A) in the styrene monomer (C). More preferred use amount is in the range of 0.2 to 2 moles. The reaction of the styrene polymer and the organic compound usually progresses in the range of room temperature to 100° C. in several seconds to several hours. Thereafter, the reaction is discontinued, for example by addition of an alcohol, and a modified styrene polymer (A) wherein the above functional group is bound is recovered as the desired product, for example by the steam stripping method.

In the process of the invention for preparing a styrene resin composition, the amount of the modified styrene polymer (A) somewhat changes according to molecular weight, but is usually 0.1 to 50 parts by weight, preferably 0.5 to 20 parts by weight and more preferably 1 to 10 weight parts per 100 parts by weight of the styrene monomer (C). When the amount of the modified styrene polymer (A) is too small, improvement effect in dispersibility is small, and too large amount is uneconomical. (Rubber-like polymer (B))

In this invention, a modified styrene polymer (A) is dissolved, if desired together with a rubber-like polymer (B), in a styrene monomer (C), and the resulting solution is subjected to bulk or bulk-suspension polymerization to obtain a styrene resin composition. As the rubber-like polymer (B), there can be used those usually used as a toughening agent for styrene resins. Examples thereof include polybutadiene, styrene-butadiene copolymers, acrylonitrile-butadiene copolymers, etc.

The preferred amount of the rubber-like polymer (B) is usually 2 to 25 parts by weight per 100 parts by weight in total of the styrene monomer (c) and the modified styrene polymer (A). An amount in this range bestows good impact resistance. (Styrene monomer (C))

As the styrene monomer (C) to be used in the invention, there can be mentioned at least one selected from styrene monomers such as styrene, vinyltoluene, 1,3-dimethylstyrene, $\alpha$-methylstyrene, chlorostyrene and vinylnaphthalene. Further, the styrene monomer (C) may contain another monomer copolymerizable with a styrene monomer.

As the monomer copolymerizable with the styrene monomer, there can be used at least one selected from vinyl monomers, for example, unsaturated nitrile monomers such as acrylonitrile and methacrylonitrile; acrylic esters such as methyl acrylate; methacrylic esters such as methyl methacrylate; etc. Such a comonomer is used in an amount of 50% by weight or less, preferably 30% by weight or less in the total monomers containing the styrene monomer.

(Bulk or bulk-suspension polymerization)

A modified polymer (A) is dissolved if desired, together with a rubber-like polymer (B), in a styrene monomer (C) to give a solution. If necessary, there can be added to this solution a diluent such as liquid paraffin, toluene or ethylbenzene, an antioxidant, a chain transfer agent such as a mercaptan or $\alpha$-methylstyrene dimer.

When the solution subjected to bulk polymerization in the absence of any catalysts, the polymerization is usually carried out with heating to 50° to 250° C. In case of polymerization in the presence of a catalyst, the polymerization is usually carried out at 20° to 200° C. depending on the decomposition temperature of a free-radical initiator, for example, a peroxide such as acetyl peroxide, benzoyl peroxide, isobutyl peroxide, bis (3,5,5-trimethylhexanoyl) peroxide, di-t-butyl peroxide or 4,4-di-t-butylperoxyperlic acid n-butyl ester, or an azo compound such as azobisisobutyronitrile, added to the system. Although the polymerization is carried out with stirring (stirring number is usually 10 to 20 rpm) until the conversion of the styrene monomer to a polymer reaches 30%, it is preferred to discontinue the stirring or make the stirring slow after the conversion became 30% or more. After the completion of polymerization, the unreacted styrene monomer and toluene, ethylbenzene, etc. are removed by heating. If desired, the resulting product is pelletized.

Further, when bulk-suspension polymerization is carried out, bulk polymerization is usually carried out in the same manner as above until the conversion of the styrene monomer becomes 50% or less (preferably 10 to 40% Then, this polymerized mixture is dispersed with stirring in an aqueous medium in the presence of a suspension stabilizer with or without a surfactant, and suspension polymerization is carried out to complete the polymerization. The resulting product is washed, dried and if necessary pelletized.

Into the thus obtained styrene resin composition, there can be compounded with good dispersibility various additives, for example, a pigment such as titanium oxide, zinc oxide, barium sulfate, calcium carbonate, carbon black, chrome yellow or cadmium yellow; a flame retardant such as tricresyl phosphate, tris (chloroethyl) phosphate, tris (dichloropropyl) phosphate, triphenyl phosphate, tris (dibromopropyl) phosphate, chlorophosphate, bromophosphate, ethane tetrabromide, chlorinated polyphenyl or antimony oxide; an inorganic filler such as carbon black, calcium carbonate, glass fiber, silica or clay; and the like. The kind and compounding rate of the additives can appropriately be determined in accordance with the purpose of use and are not particularly limited.

EXAMPLES

This invention is specifically described below by examples and comparative examples, but the invention is not limited to these examples.

EXAMPLE 1

7,200 g of cyclohexane and 1,800 g of styrene were charged into a 20 l stainless steel polymerizing reactor in a nitrogen atmosphere, 96 m moles of tetrahydrofuran and 22.1 m moles of n-butyllithium as a polymerization initiator were added thereto, and polymerization was carried out at 50° C. for 2 hours.

18.4 m moles of N-methylpyrrolidone was added to the resulting anionic living polystyrene, and after stirring 15 minutes, 20 m moles of methanol was added to discontinue the reaction.

The solution was added to a solution of 2.0% by weight of 4-methyl-di-t-butylphenol in methanol to coagulate the formed polymer, which was then dried at 60° C. under reduced pressure to obtain a modified styrene polymer.

Then, 161 g of commercial polybutadiene (BR; produced by ASAHI CHEMICAL INDUSTRY CO., LTD., trade name: Diene 35), 2139 g of styrene and 115 g of the modified styrene polymer were put in a 10 l polyethylene vessel, and the mixture was shaken for dissolution at room temperature for 16 hours to obtain a solution.

The whole solution was transferred into a washed stainless polymerizing reactor having an inner volume of 4 l. Then, polymerization was carried out at 130° C. until the desired conversion was reached while shearing force was given by stirring of 300 rpm, and after cooling, the contents (bulk polymerization solution) were taken out.

After washing a stainless steel polymerizing reactor having an inner volume of 4 l, 625 g of the bulk polymerization solution and 1875 g of a 0.2% by weight of aqueous solution of polyvinyl alcohol were put in the reactor, and the mixture was heated to 70° C. Then, a solution of 1.25 g of benzoyl peroxide and 0.63 g of dicumyl peroxide in 20 g of styrene was added. Therefore, suspension polymerization was carried out at 70° C. for 1 hour, at 90° C. for 1 hour, at 110° C. for 1 hour, at 130° C. for 1 hour and at 140° C. for 3 hours. After cooling, the formed styrene resin composition was washed with water and dried at 60° C. for 6 hours under reduced pressure.

The obtained styrene resin composition was kneaded and pelletized by an extruder. Further, specimens for evaluation of physical properties were prepared by using a plate obtained by compression molding of the pellets.

Then, 16.6 weight parts of perchloropentacyclodecane (Dechlorane Plus 515, a trademark for a product of Hooker Chem.) and 8.4 parts by weight of antimony oxide were compounded into 100 parts by weight of this styrene resin composition to obtain a flame-retarded polystyrene resin composition, Specimens of this composition were prepared in the same manner as above.

Tensile elastic modulus and Izod impact strength were measured according to JIS K7113 and JIS K7110 respectively, using these specimens.

EXAMPLE 2

The same procedure as in Example 1 was carried out except that 4,4'-bis(diethylamino)benzophenone was used as a compound to be reacted with the anionic living polystyrene, whereby a styrene resin composition and a flame-retarded polystyrene resin composition were obtained. Specimens were prepared from each of them.

COMPARATIVE EXAMPLE 1

The same procedure as in Example 1 was repeated except that after the preparation of the anionic living polystyrene, the reaction was completed with methanol without carrying out the postreaction with an organic compound, whereby a styrene resin composition and a flame-retarded polystyrene resin composition, and specimens were prepared from each of them.

EXAMPLE 3

7,200 g of cyclohexane and 1,800 g of styrene were charged into a 20 l stainless steel polymerizing reaction in a nitrogen atmosphere, 93 m moles of tetrahydrofuran and 40.1 m moles of n-butyllithium as a polymerization initiator were added thereto, and polymerization was carried out at 50° C. for 2 hours.

Then, 36.0 m moles of N-methylpyrrolidone was added, and after 15 minutes stirring, 40 m moles of methanol was added to discontinue the reaction.

The resulting solution was added to a 2.0% by weight of solution of 4-methyl-di-t-butylphenol in methanol to coagulate the formed polymer, which was then dried at 60° C. under reduced pressure.

Thereafter, in the same manner as in Example 1, a styrene resin composition and a flame-retarded polystyrene resin composition were obtained, and specimens were prepared from each of them.

COMPARATIVE EXAMPLE 2

A styrene resin composition and a flame-retarded polystyrene resin composition were obtained in the same manner as in Example 1 except that styrene was bulk-suspension polymerized in the presence of BR without using a modified polystyrene polymer, and specimens were prepared from each of them.

The results are shown in Table 1.

It is seen from the results of Table 1 that in case of the styrene resin compositions of the invention, the lowering of physical properties is very small even when the flame retardants were added. On the other hand, when the styrene polymer having no functional group was used (Comparative example 1) or in case of the mere rubber-modified styrene resin composition (Comparative example 2), the lowering of impact resistance and tensile elastic modulus due to the addition of the flame retardants is striking.

Thus according to this invention, when various additives such as a pigment, a flame retardant and an inorganic filler are added, a styrene resin composition is provided exhibiting only small lowering of physical properties and extremely excellent in the dispersibility of the additives, in comparison with conventional styrene resins.

TABLE 1

|   |   | Example 1 | Example 2 | Comparative example | Example 3 | Comparative example |
|---|---|---|---|---|---|---|
| A | Molecular weight ($\times 10^4$) | 9.8 | 10.5 | 9.8 | 5.3 | — |
|   | Presence of a functional group | yes | yes | no | no | — |
| B | Izod impact strength (kg · cm/cm) | 8.5 | 8.7 | 8.5 | 8.9 | 9.2 |
|   | Tensile elastic modulus (kg/cm$^2$) | 20,800 | 20,780 | 21,000 | 19,800 | 19,760 |
|   | Combustion state | burned | burned | burned | burned | burned |
| C | Izod impact strength (kg · cm/cm) | 7.9 | 7.7 | 6.3 | 8.0 | 6.8 |
|   | Tensile elastic modulus (kg/cm$^2$) | 19,600 | 19,900 | 18,600 | 19,100 | 18,560 |
|   | Combustion state | Self-extinguishment | Self-extinguishment | Self-extinguishment | Self-extinguishment | Self-extinguishment |

(Note)
A: (modified) styrene polymer
B: styrene resin composition
C: flame-retarded styrene resin composition

What we claim is:

1. A process for preparing a styrene resin composition which comprises subjecting to bulk or bulk-suspension polymerization a solution obtained by dissolving a modified styrene polymer (A) in a styrene monomer (C), said modified styrene polymer being obtained by introducing directly or through another atomic group at least one functional group represented by the general formula into the styrene polymer chain obtained by polymerizing 90 to 100% by weight of a styrene monomer with 0 to 10% by weight of a monomer copolymerizable with the styrene monomer.

2. The process for preparing a styrene resin composition according to claim 1 wherein the amount of the modified styrene polymer (A) dissolved in said styrene monomer (C) is 0.1 to 50 parts by weight per 100 parts by weight of the styrene monomer (C).

3. The process for preparing a styrene resin composition according to claim 1 wherein the modified styrene polymer (A) is a styrene polymer obtained by reacting a living anionic styrene polymer with at least one compound selected from an N-substituted lactam or corresponding thiolactam, an N-substituted ethyleneurea or corresponding thiourea, an N-substituted aminoketone or corresponding thioketone, and an N-substituted aminoaldehyde or corresponding thioaldehyde, and then hydrolyzing the resulting product.

4. A styrene resin composition obtained by the method of claim 1.

5. The process for preparing a styrene resin composition according to claim 1 wherein a rubber-like polymer (B) is dissolved together with said modified styrene polymer (A).

6. The process for preparing a styrene resin composition according to claim 5, wherein said rubber-like polymer (B) is selected from the group consisting of polybutadiene, styrene-butadiene copolymers and acrylonitrile-butadiene copolymers.

7. The process for preparing a styrene resin composition according to claim 5, wherein the amount of the rubber-like polymer (B) dissolved together with said modified styrene polymer (A) comprises from 2 to 25 parts by weight per 100 parts by weight of the styrene monomer (C) and the modified styrene monomer (A).

8. The process for preparing a styrene resin composition according to claim 1, wherein said styrene monomer is selected from the group consisting of styrene, vinyltoluene, 1,3-dimethylstyrene, α-methylstyrene, chlorostyrene, and vinylnaphthalene.

9. The process for preparing a styrene resin composition according to claim 1, wherein said monomer copolymerizable with the styrene monomer is a conjugated diene monomer.

10. The process for preparing a styrene resin composition according to claim 1, wherein the amount of the modified styrene polymer (A) dissolved in the styrene monomer (C) is from 0.1 to 50 parts by weight per 100 parts by weight of the styrene monomer (C).

11. The process for preparing a styrene resin composition according to claim 10, wherein the amount of the modified styrene polymer (A) dissolved in the styrene monomer (C) is from 1 to 10 parts by weight per 100 parts by weight of the styrene monomer (C).

12. The process for preparing a styrene resin composition according to claim 1 which comprises bulk polymerizing said solution at a temperature of between 50° to 250° C. in the absence of a catalyst.

13. The process for preparing a styrene resin composition according to claim 1, which comprises bulk polymerizing said solution at a temperature of between 20° to 200° C. in the presence of a catalyst.

14. The process for preparing a styrene resin composition according to claim 1, which comprises bulk polymerizing said solution with stirring until the conversion of the styrene monomer to a polymer reaches 30%.

15. The process for preparing a styrene resin composition according to claim 1 which comprises bulk suspension polymerizing said solution with stirring until the conversion of the styrene monomer to a polymer reaches 10–50% thereby forming a polymerized mixture, dispersing said polymerized mixture in an aqueous medium in the presence of a suspension stabilizer, and suspension polymerizing said aqueous dispersion.

16. The process for preparing a styrene resin composition according to claim 1 further comprising compounding the styrene resin composition with one or more additives selected from the group consisting of pigments, flame retardants, and inorganic fillers.

* * * * *